United States Patent
Liu et al.

(10) Patent No.: US 11,838,053 B2
(45) Date of Patent: Dec. 5, 2023

(54) OPTICAL NETWORK UNIT AND METHOD FOR CONTROLLING CONNECTION BETWEEN OPTICAL NETWORK UNIT AND OPTICAL LINE TERMINAL

(71) Applicant: Realtek Semiconductor Corp., HsinChu (TW)

(72) Inventors: Juan Liu, Suzhou (CN); Hua Zhen Tian, Suzhou (CN); Lian Cheng, Suzhou (CN)

(73) Assignee: Realtek Semiconductor Corp., HsinChu (TW)

( * ) Notice: Subject to any disclaimer, the term of this patent is extended or adjusted under 35 U.S.C. 154(b) by 123 days.

(21) Appl. No.: 17/699,156

(22) Filed: Mar. 20, 2022

(65) Prior Publication Data

US 2022/0345222 A1 Oct. 27, 2022

(30) Foreign Application Priority Data

Apr. 23, 2021 (CN) .......................... 202110440295.4

(51) Int. Cl.
*H04B 10/27* (2013.01)
(52) U.S. Cl.
CPC .................................... *H04B 10/27* (2013.01)
(58) Field of Classification Search
None
See application file for complete search history.

(56) References Cited

U.S. PATENT DOCUMENTS

| 9,066,165 | B2 * | 6/2015 | Guo | H04L 12/2885 |
| 9,762,326 | B2 * | 9/2017 | Lin | H04L 65/40 |
| 9,998,211 | B2 * | 6/2018 | Lin | H04B 10/032 |
| 11,678,092 | B2 * | 6/2023 | Li | H04L 67/1095 370/254 |

FOREIGN PATENT DOCUMENTS

| CN | 110620775 | A | | 12/2019 | |
| CN | 111314805 | A | * | 6/2020 | H04L 69/22 |
| CN | 111314805 | A | | 6/2020 | |

* cited by examiner

*Primary Examiner* — Jai M Lee
(74) *Attorney, Agent, or Firm* — Winston Hsu

(57) ABSTRACT

The present invention provides a method for controlling a connection between an ONU and an OLT, wherein the method includes the steps of: (a) downloading an OMCI message from the OLT; (b) enabling an OMCI management program to process the OMCI message to try to generate a plurality of models; (c) if the plurality of models are not successfully generated by using the OMCI management program to process the OMCI message, modifying the OMCI management program to generate a modified OMCI management program when the ONU is not connected with the OLT; and (d) using the modified OMCI management program to process the OMCI message to try to generate the plurality of models.

10 Claims, 2 Drawing Sheets

OPTICAL NETWORK UNIT AND METHOD FOR CONTROLLING CONNECTION BETWEEN OPTICAL NETWORK UNIT AND OPTICAL LINE TERMINAL

BACKGROUND OF THE INVENTION

1. Field of the Invention

The present invention relates to a passive optical network (PON).

2. Description of the Prior Art

The passive optical network is a passive optical network communication system composed of an optical line terminal (OLT) of a local end equipment, an optical network unit (ONU) of a terminal equipment and an optical distribution network (ODN). In the passive optical network communication system, before the ONU communicates, it needs to register with the OLT, and after the registration is successful, the OLT will use a management control channel to configure the ONU. After the configuration is successful, the ONU can provide communication forwarding services for the equipment to which it belongs.

In practice, the ONU needs to be connected to devices corresponding to different OLT vendors. Each of the OLT vendors defines an managed entity (ME) of an optical network terminal (ONT) management and control interface (OMCI) according to the standard ITU-T G.988, but each vendor may have some private managed entities defined by itself, and these private managed entities will affect the configuration of the ONU performed by the OLT, and the rules of the OMCI messages sent by the device of each OLT vendor to configure the ONU are not exactly the same. Therefore, the above issues sometimes lead to abnormal connection between the ONU and the OLT, which affects the configuration speed of the passive optical network.

SUMMARY OF THE INVENTION

It is therefore an objective of the present invention to provide a method for controlling the connection between ONU and OLT, which can control the ONU to modify the OMCI management program when it is offline with the OLT, so that the modified OMCI management program can use the previously downloaded OMCI messages to try to generate multiple models that comply with the standard ITU-T G.988, so as to successfully complete the verification with the OLT and start the communication service, to solve the above-mentioned problems.

In one embodiment of the present invention, a method for controlling a connection between an ONU and an OLT is provided, wherein the method comprises the steps of: (a) downloading an OMCI message from the OLT; (b) enabling an OMCI management program to process the OMCI message to try to generate a plurality of models; (c) if the plurality of models are not successfully generated by using the OMCI management program to process the OMCI message, modifying the OMCI management program to generate a modified OMCI management program when the ONU is not connected with the OLT; and (d) using the modified OMCI management program to process the OMCI message to try to generate the plurality of models.

In one embodiment of the present invention, an ONU is configured to perform the steps of: (a) downloading an OMCI message from an OLT; (b) enabling an OMCI management program to process the OMCI message to try to generate a plurality of models; (c) if the plurality of models are not successfully generated by using the OMCI management program to process the OMCI message, modifying the OMCI management program to generate a modified OMCI management program when the ONU is not connected with the OLT; and (d) using the modified OMCI management program to process the OMCI message to try to generate the plurality of models.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
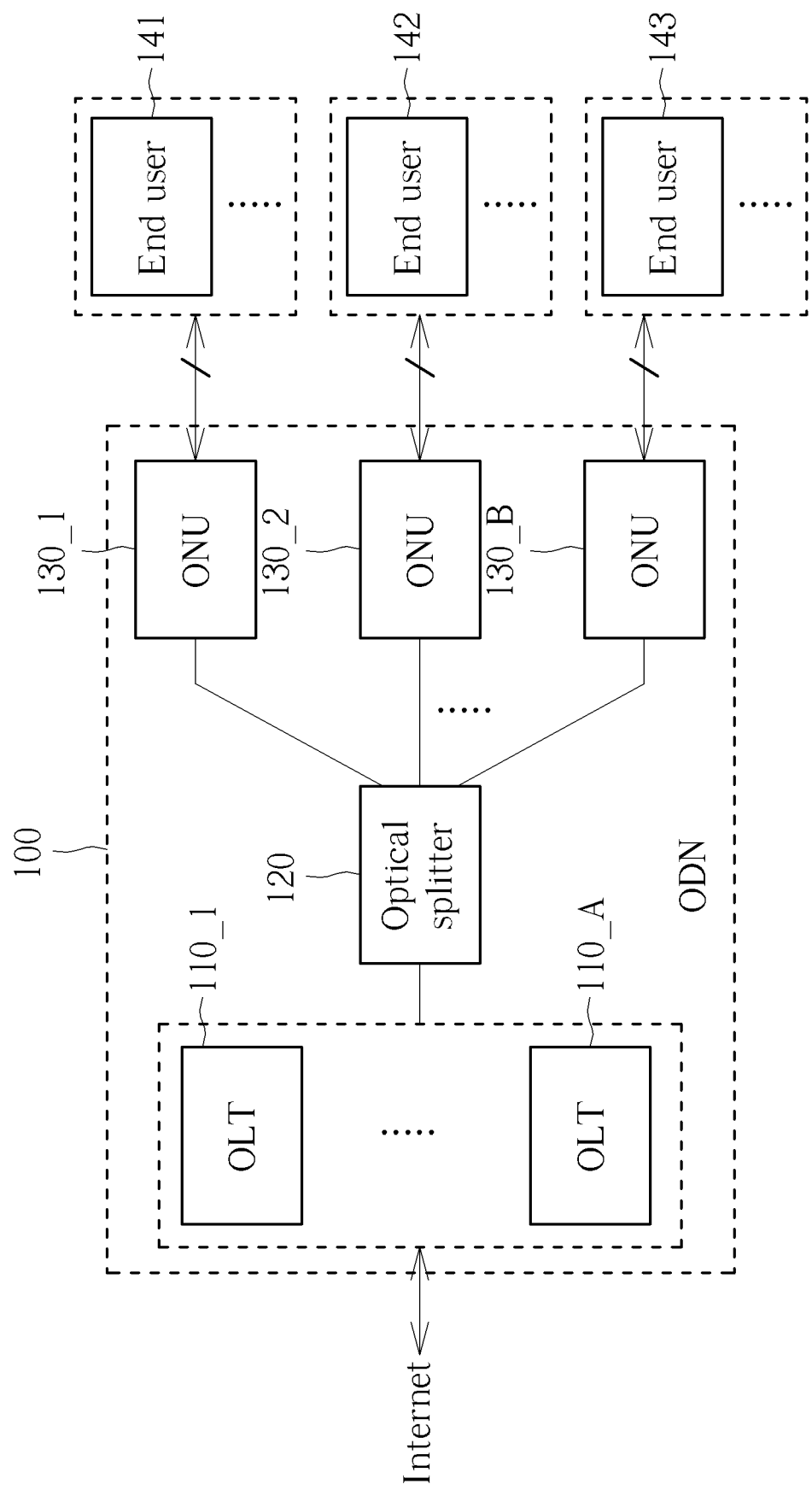
FIG. 1 is a diagram illustrating an optical distribution network according to one embodiment of the present invention.

FIG. 1 is a diagram illustrating an optical distribution network (ODN) 100 according to one embodiment of the present invention. As shown in FIG. 1, the ODN 100 comprises a plurality of OLTs 110_1-110_A, an optical splitter 120 and a plurality of ONUs 130_1-130_B, wherein the OLTs 110_1-110_A are connected to the optical splitter 120 via optical filters, and then connected to the ONUs 130_1-130_B. Each ONU can be connected to a plurality of end users, for example, the ONU 130_1 is connected to an end user 141, the ONU 130_2 is connected to an end user 142, and the ONU 130_B is connected to an end user 143. Through the ODN 100, the end users 140, 142, and 143 can be connected to the Internet for communications. In this embodiment, the ODN 100 is a passive optical network, especially a gigabit passive optical network (GPON).

In the operation of ODN 100, each of the OLTs 110_1-110_A will manage the ONUs 130_1-130_B by using OMCI messages (for example, OMCI messages that comply with the standard ITU-T G.988), such as configuration management, fault management, performance management, safety management, . . . etc. However, as mentioned in the background of the invention, OLTs 110_1-110A may be manufactured by different vendors, and the OLT manufactured by each vendor may have its own private managed entity, therefore, if the ONUs 130_1-130_B does not support or cannot interpret some of the OMCI messages of the OLTs 110_1-110_A, the connection between the ONU 130_1-130_B and some OLTs 110_1-110_A will be abnormal, and the communication services cannot be performed completely.

In order to solve the above problem, this embodiment proposes a method for controlling the ONUs 130_1-130_B to connect with the OLTs 110_1-110_A, which allows the ONUs 130_1-130_B to modify the OMCI management program in an offline state. After the OMCI management program is modified, the ONUs 130_1-130_B are controlled to generate the required models based on the modified OMCI management program, to verify the connection with some OLTs 110_1-110_A. By using the above methods, the time for R&D personnel to find and deal with problems can be reduced, so as to reduce the cost of personnel and time.

Figure 2:
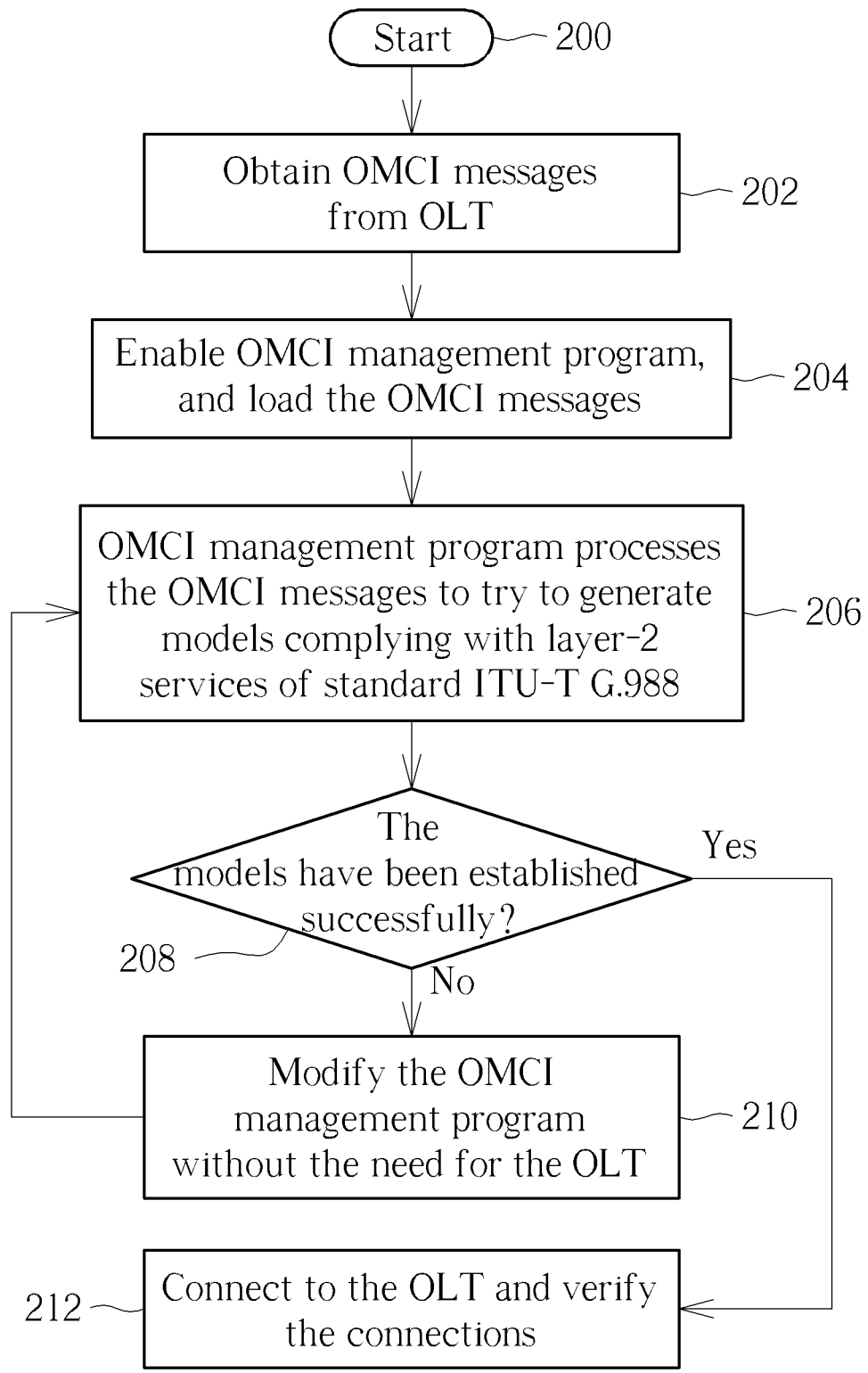
FIG. 2 is a flowchart of a method for controlling a connection between the ONU and the OLT.

Specifically, refer to the flowchart of a method for controlling the connection between the ONU and the OLT shown in FIG. 2, wherein the following content is described with the connection verification of the ONU 130_1 and the OLT 110_1. In Step 200, the flow starts, and the ONU 130_1 is powered on and starts an initialization operation. In Step 202, the ONU 130_1 obtains the OMCI messages from the OLT 110_1, and stores the OMCI messages in a hexadecimal format. For example, the ONU 130_1 can directly connect to the OLT 110_1 through the optical splitter 120 and related optical fibers, and obtain the OMCI messages from the OLT 110_1. In another example, a protocol analyzer can be connected to the optical fiber between the ONU 130_1 and the OLT 110_1, and the OMCI messages from the OLT 110_1 can be obtained through the protocol analyzer, and then the OMCI messages are sent to the ONU 130_1. In Step 204, the ONU 130_1 enables the service management system, and loads the OMCI messages obtained in Step 202. In Step 206, the OMCI management program in the service management system of the ONU 130_1 processes the OMCI messages to try to establish a plurality of models that comply with layer-2 services of the standard ITU-T G.988, wherein the plurality of models comprise a GPON encapsulation method (GEM) port network CTP, a GPON encapsulation method interworking termination point, media access control (MAC) bridge port configuration data, VLAN tagging operation configuration data, . . . etc. Since the contents of the above models are well-known by a person skilled in the art, the detailed descriptions are omitted here. In Step 208, the service management system of the ONU 130_1 determines if the models complying with the layer-2 service of the standard ITU-T G.988 have been successfully established, if not, the flow enters Step 210; if yes, the flow enters Step 212. In Step 210, the ONU 130_1 modifies the OMCI management program in the service management system without the need for the OLT 110_1, for example, the managed entities provided by different vendors are automatically or manually modified to generate different OMCI management program. Then, after the modification of the OMCI management program is completed, the flow returns to Step 206 to try again to generate models that comply with the layer-2 service of the standard ITU-T G.988.

It is noted that in Step 210, since the ONU 130_1 itself has stored the OMCI messages, the ONU 130_1 does not need to make any other connection with the OLT 110_1, and can independently modify the OMCI management program based on the OMCI messages, or even repeatedly modify the OMCI management program to generate a suitable OMCI management program to process the OMCI messages to generate the models that can comply with the standard ITU-T G.988. The above steps of modifying the OMCI management program can be executed by analyzing the fields and contents of the OMCI messages, the format of the OMCI messages . . . and so on. In detail, part of the steps to modify the OMCI management program can be performed by a back-end terminal computer or engineering personnel, that is, the OMCI messages stored in the ONU 130_1 can be read by the terminal computer via any other network interface, and the terminal computer analyzes the content to determine the vendor information to which the OMCI messages belongs, so as to determine how to modify the OMCI management program. It should be noted that since the content of the OMCI message is well-known a person skilled in the art and its content is poor in readability, the detailed descriptions are omitted here.

In Step 212, after successfully generating the plurality of models complying with the layer-2 service of the standard ITU-T G.988, the ONU 130_1 connects the OLT 110_1 and verifies the connections by using the plurality of models, to start the communications with the OLT 110_1.

In the above embodiment, the ONU 130_1 modifies the OMCI management program when it is offline with the OLT 110_1, and the modified OMCI management program uses the previously downloaded OMCI messages to try to generate models complied with the standard ITU-T G. 988, to successfully complete the connection verification with the OLT 110_1 and start the communication services. Therefore, this embodiment does not need to frequently perform connection verification with the OLT 110_1, and the overall processing method is more flexible, which can reduce the time for R&D personnel to find and deal with problems, thereby reducing the cost of personnel and time.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for controlling a connection between an optical network unit (ONU) and an optical line terminal (OLT), comprising:
    (a) downloading an optical network terminal management and control interface (OMCI) message from the OLT;
    (b) enabling an OMCI management program to process the OMCI message to try to generate a plurality of models;
    (c) if the plurality of models are not successfully generated by using the OMCI management program to process the OMCI message, modifying the OMCI management program to generate a modified OMCI management program when the ONU is not connected with the OLT; and
    (d) using the modified OMCI management program to process the OMCI message to try to generate the plurality of models.

2. The method of claim 1, further comprising:
    (e) repeating steps (c) and (d) until the plurality of models are successfully generated.

3. The method of claim 1, wherein in the step of modifying the OMCI management program to generate the modified OMCI management program in step (c), no connection is made to the OLT to request processing or verification of the OMCI management program.

4. The method of claim 1, wherein the ONU is applied to a Gigabit Passive Optical Network (GPON).

5. The method of claim 1, wherein the plurality of models are complied with layer-2 services of a standard ITU-T G.988.

6. An optical network unit (ONU), configured to perform the steps of:
    (a) downloading an optical network terminal management and control interface (OMCI) message from an optical line terminal (OLT);
    (b) enabling an OMCI management program to process the OMCI message to try to generate a plurality of models;
    (c) if the plurality of models are not successfully generated by using the OMCI management program to process the OMCI message, modifying the OMCI management program to generate a modified OMCI management program when the ONU is not connected with the OLT; and (d) using the modified OMCI management program to process the OMCI message to try to generate the plurality of models.

7. The ONU of claim 6, further comprising:

(e) repeating steps (c) and (d) until the plurality of models are successfully generated.

8. The ONU of claim 6, wherein in the step of modifying the OMCI management program to generate the modified OMCI management program in step (c), no connection is made to the OLT to request processing or verification of the OMCI management program.

9. The ONU of claim 6, wherein the ONU is applied to a Gigabit Passive Optical Network (GPON).

10. The ONU of claim 6, wherein the plurality of models are complied with layer-2 services of a standard ITU-T G.988.

\* \* \* \* \*